Patented Aug. 13, 1935

2,011,213

UNITED STATES PATENT OFFICE 2,011,213

ENAMEL LACQUERED WIRE AND LACQUER FOR MAKING SAME

Alfred Ehrenzweig, Wurenlos/Aargau, Switzerland

No Drawing. Application December 30, 1931, Serial No. 584,909. In Switzerland March 6, 1931

10 Claims. (Cl. 134—26)

This invention relates to enamel lacquered wires and to lacquers for making same.

The production of enamel lacquered wires is, as is known, effected by drawing the polished wire, for example, copper wire, through a bath of lacquer or varnish whereby the wire is coated with a layer of the lacquer. Thereafter the treated wire is introduced into an oven, in which the enamel layer is fixed by heating. Lacquers or varnishes containing or prepared from asphalt, pitch, natural resin and oil have been hitherto employed for this purpose.

In practice the enamel layer has to comply with certain strict conditions. It must show no cracks on bending, it must be resistant to temperature and to solvents and corrosive influences, it must possess good insulating power and must not be easily damaged during repairs. It has been found that by employing phenol resin lacquers as hereinafter described lacquered wires can be prepared, which show substantial advantages in many directions, over the enamel lacquered wires hitherto prepared with the aid of lacquers or varnishes containing or prepared from asphalt, pitch, natural resins and oil. The preparation is effected in the above described manner known per se.

The resinous phenol-aldehyde condensation products capable of hardening, notwithstanding their admirable electrical properties, could hitherto be only employed to a limited degree for the production of insulating coatings, owing to their brittleness and their too slight adhesive properties. According to this invention it has been found that these disadvantages of the hardenable phenol-aldehyde resins can be overcome by treating them, if necessary in the warm, in the manner hereinafter described, with tricresyl phosphate and high-boiling organic solvents. Glycerine esters, particularly triacetin, as well as dicresylin, oil of turpentine, glycerine and mixtures of these substances have been found to be particularly suitable as high-boiling organic solvents and in part also act as softening agents.

It has further been found to be advisable to introduce into the lacquers small quantities of acid, such as glacial acetic acid or lactic acid, or anhydride of lactic acid. Resols which are capable of hardening and have been condensed in known manner, for example with ammonia, may be employed as phenol-aldehyde resins. Oil-soluble phenol-aldehyde condensation products may also be employed by dissolving the same in fatty oils and combining the resulting solutions with solutions obtained by dissolving a resol in the aforesaid high-boiling solvents with the addition of tricresyl phosphate. Heat-resisting cellulose esters, particularly acetyl cellulose, may also be added to the phenol-aldehyde resin lacquers.

The following examples serve to illustrate how the process of the invention may be carried into effect:

Example 1

550 gms. of a 75% solution of a hardenable phenolformaldehyde resin (resol) in spirit,
335 gms. of tricresyl phosphate
200 gms. of triacetin,
175 gms. of dicresylin,
112 gms. of oil of turpentine,
9 gms. of glycerine and
6 gms. of glacial acetic acid are combined together to form a homogeneous solution.

Dicresylin is a softening agent introduced into the trade by the firm Heyden, of Radebeul/Dresden, and has a boiling point of 250 to 300° C. and a flash point of 100° C.

Example 2

300 gms. of a 75% solution of a hardenable phenolformaldehyde resin (resol) in spirit,
300 gms. of tricresyl phosphate,
60 gms. of a mixture of about equal parts of lactic acid and anhydride of lactic acid and
200 gms. of triacetin are combined together to form a homogeneous solution.

Example 3

950 gms. of a 75% solution of a hardenable phenolformaldehyde resin (resol) in spirit,
49 gms. of acetyl cellulose,
111 gms. of glycerine,
216 gms. of glacial acetic acid,
442 gms. of tricresyl phosphate and
1832 gms. of triacetin are combined together to form a homogeneous solution.

Example 4

100 gms. of an oil-soluble phenol-aldehyde resin are boiled with 100 gms. of linseed oil, and 100 gms. of a hardenable phenolformaldehyde resin (resol) are boiled with 200 gms. of dicresylin.

The two solutions are mixed and 100 gms. of tricresylphosphate added, as well as such amount of oil of turpentine or petroleum that the desired lacquer consistency is reached.

The lacquers can be coloured as desired by the addition of pigments.

The polished wire, for example of copper, is drawn through a bath of lacquer whereby a coating is formed on the wire. The coating is hardened by heating it in an oven, for example at temperatures of 280–350° C. This procedure is repeated several times by drawing the wire again through a bath of lacquer and hardening the coating by heating the coated wire.

The enamel lacquered wires prepared according to the present process have high insulating power. The lacquer layers can be kept thinner than usual so that considerably more windings than hitherto can be applied to spools of the same size. For example, with a layer giving rise after lacquering to an increase of 0,015 mm. in the thickness of the wire, i. e. with a layer of lacquer 0,0075 mm. thick, the lacquered wire wound on a mandrel showed from wire to mandrel a disruptive strength of 1200 to 1500 volts and when stranded showed, when measured from wire to wire, a disruptive strength of 2400 to 3000 volts. The artificial resin lacquer layers which have been hardened by heat are insensitive to high temperature. They also show a high resistance to corrosive influences of every kind, both against weathering influences and against chemical actions, for example of acids or hot vapours. They are insoluble in benzol, benzine and oils.

The present invention is also attended by a large number of advantages in the production of enamelled wires. The consistency of the artificial resin lacquers remains constant during the operation. The lacquer is easily dispersed and enables the production of lacquer coatings to be effected without disturbances and irregularities in a very simple manner, and one depending much less on the attention of the machine operatives than hitherto. The periodic replenishments of the low-boiling solvents otherwise necessary are no longer required, and the raw or burnt out places caused by the lack of homogeneity of the lacquers or varnishes no longer occur.

Owing to the possibility of operating free from disturbances the occurrence of faulty material can be almost completely avoided, whilst in the processes hitherto usually employed a fairly high waste always had to be reckoned with.

The rate, at which the wire passes through the lacquer baths and the drying channels in the process according to the present invention, is about twice as great as has hitherto been possible.

Owing to all the aforesaid advantages the efficiency of the machines is increased by about 100%.

I claim:

1. Phenol-aldehyde resin lacquer according to claim 7, containing an acid.

2. Phenol-aldehyde resin lacquer according to claim 7, containing a heat-resisting cellulose ester.

3. Phenol-aldehyde resin lacquer according to claim 7, containing an oil-soluble phenol-aldehyde condensation product dissolved in an air-drying oil.

4. Phenol-aldehyde resin lacquer according to claim 7, containing a coloring agent.

5. Method of enamelling wire which comprises passing the bare clean wire through a body of a lacquer composition comprising a hardenable phenolic resin and tricresyl phosphate dissolved in triacetin, and hardening the resulting coating by heating.

6. Enamel lacquered wire consisting of a metal wire and a hardened coating composition which contains as essential components a hardenable phenolformaldehyde resin and tricresyl phosphate dissolved in triacetin in direct contact with the clean surface of the wire.

7. Lacquer for enamel wire comprising as essential components a hardenable phenolformaldehyde resin and tricresyl phosphate, dissolved in triacetin.

8. Lacquer for enamal wire comprising as essential components a hardenable phenolformaldehyde resin and tricresyl phosphate, dissolved in a mixture of triacetin and glycerine.

9. Lacquer for enamel wire comprising as essential components a hardenable phenolformaldehyde resin and tricresyl phosphate, dissolved in a mixture of triacetin, glycerine and oil of turpentine.

10. Lacquer for enamel wire comprising as essential components a hardenable phenolformaldehyde resin and tricresyl phosphate, dissolved in a mixture of triacetin, glycerine, turpentine oil and dicresylin.

ALFRED EHRENZWEIG.